United States Patent
Burton et al.

(10) Patent No.: US 10,284,634 B2
(45) Date of Patent: May 7, 2019

(54) CLOSED-LOOP INFRASTRUCTURE ORCHESTRATION TEMPLATES

(71) Applicant: INTERNATIONAL BUSINESS MACHINES CORPORATION, Armonk, NY (US)

(72) Inventors: Peter H. Burton, Vancouver (CA); Shahir A. Daya, North York (CA); Luc Desrosiers, Hampshire (GB); Manvendra Gupta, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 15/409,785

(22) Filed: Jan. 19, 2017

(65) Prior Publication Data

US 2018/0205600 A1    Jul. 19, 2018

(51) Int. Cl.
*G06F 15/177*    (2006.01)
*H04L 29/08*    (2006.01)
*H04L 12/24*    (2006.01)

(52) U.S. Cl.
CPC .......... *H04L 67/10* (2013.01); *H04L 41/0843* (2013.01); *H04L 41/0893* (2013.01)

(58) Field of Classification Search
USPC ....... 709/203, 206, 217, 219, 220, 221, 222, 709/223, 224, 226, 228, 230, 232;
(Continued)

(56) References Cited

U.S. PATENT DOCUMENTS

| 7,469,279 | B1 * | 12/2008 | Stamler ............... H04L 41/0672 |
| | | | 709/220 |
| 9,741,005 | B1 * | 8/2017 | Adogla .............. G06Q 10/0635 |

(Continued)

FOREIGN PATENT DOCUMENTS

| WO | 2013122815 | 8/2013 |
| WO | 2014058411 | 4/2014 |

OTHER PUBLICATIONS

Working with Orchestration and Stacks; VMware Integrated OpenStack 1.0; Retrieved from the Internet Feb. 3, 2016; URL: http://pubs.vmware.com/integrated-openstack-1/index.jsp?topic=%2Fcom.vmware.openstack.userdoc%2FGUID-04D3B5E4-DD54-4D60-A34D-67227EFE65 . . . ; 2 pages.
(Continued)

*Primary Examiner* — Quang N Nguyen
(74) *Attorney, Agent, or Firm* — Schmeiser, Olsen & Watts; Mark C. Vallone

(57) ABSTRACT

A system, program and method are provided for monitoring and detecting changes for infrastructure orchestration templates. A computer provisions a stack using an existing template. The computer detects a change in the stack, wherein the detecting includes comparing at least one configuration element of the stack to at least one definition stored within a repository of a system. The computer determines whether the change is relevant to the existing template. In response to the change being relevant, the computer determines a type of change in the stack. The computer performs either updating a relevant section of the existing template or creating a new template by adding a new portion, which defines a new configuration element according to the type of change in the stack.

13 Claims, 11 Drawing Sheets

(58) Field of Classification Search
USPC .............................................. 704/275; 718/1
See application file for complete search history.

(56) References Cited

U.S. PATENT DOCUMENTS

| | | | | |
|---|---|---|---|---|
| 10,089,152 | B1* | 10/2018 | Kramer | G06F 9/5072 |
| 2010/0110933 | A1 | 5/2010 | Wilcock et al. | |
| 2014/0129690 | A1* | 5/2014 | Jaisinghani | G06F 9/5061 |
| | | | | 709/222 |
| 2014/0156282 | A1* | 6/2014 | Madere | G06F 17/27 |
| | | | | 704/275 |
| 2015/0100684 | A1 | 4/2015 | Maes et al. | |
| 2016/0014042 | A1 | 1/2016 | Kampas et al. | |
| 2016/0072676 | A1* | 3/2016 | Gomadam | H04L 41/12 |
| | | | | 709/221 |
| 2016/0162312 | A1* | 6/2016 | Doherty | G06F 11/30 |
| | | | | 718/1 |

OTHER PUBLICATIONS

Finneran, Colette; What CSPs want from their OSS for Cloud Based Networking?; Jun. 3, 2015; Retrieved from the Internet Feb. 2, 2016; URL: http://servicemanagement360.com/what-kind-of-oss-do-csps-need-for-cloud-based-networking/; 7 pages.

* cited by examiner

CLOSED-LOOP INFRASTRUCTURE ORCHESTRATION TEMPLATES

TECHNICAL FIELD

The present invention relates to monitoring templates and template stacks for changes and matching the change to a corresponding component of the existing templates in a predetermined number of stack instances.

BACKGROUND

Cloud computing refers to the delivery of scalable and pooled computing, storage and networking capacity as a service to a network of end-recipients. The name "cloud computing" comes from the use of clouds as an abstraction for the complex infrastructure of networks and associated hardware operative within the cloud. Cloud computing provides services for a user's data, software and computation over a network, for example. Such computing capability relies on sharing of resources to achieve coherence and economies of scale similar to a utility (like the electricity grid) over a network (typically the Internet).

Applications deployed on resources supporting the cloud presently often have to be manually deployed and that consumes considerable administrative time. The manual steps of deploying the application include the provisioning and instantiation of the infrastructure, which requires linking the installation of the application or deployment of an image to the full knowledge of the deployed infrastructure. Manual deployment typically requires numerous sequences of steps usually launched by the user who attempts to deploy the application.

Templates allow users to describe deployments of complex cloud applications in text files called templates. These templates are parsed and executed by the template engine to instantiate the infrastructure described in the template. The instantiated infrastructure is typically called a stack.

Examples of stack management include the OpenStack Orchestration program called Heat. Heat Orchestration Templates (HOT) are created using the YAML markup language, which are text files that get executed by the Heat Engine. The Amazon Web Services (AWS) CloudFormation service is another example of an infrastructure orchestration template system.

Once an infrastructure is instantiated from a template, the infrastructure is disconnected from the template. Changes to the template can be applied to any existing instantiations; i.e., stacks of that template in an automated fashion. There are ways to apply changes to existing instantiations and prior art for such a process exists. However, presently any changes made to the possibly many stacks for a given template never make it back to the template in any automated/reliable way.

SUMMARY

A system, program and method are provided for monitoring and detecting changes for infrastructure orchestration templates. A computer provisions a stack using an existing template. The computer detects a change in the stack, wherein the detecting comprises comparing at least one configuration element of the stack to at least one definition stored within a repository of a system. The computer determines whether the change is relevant to the existing template. In response to the change being relevant, the computer determines a type of change in the stack. The computer performs either updating a relevant section of the existing template or creating a new template by adding a new portion, which defines a new configuration element according to the type of change in the stack.

DETAILED DESCRIPTION

Figure 1:
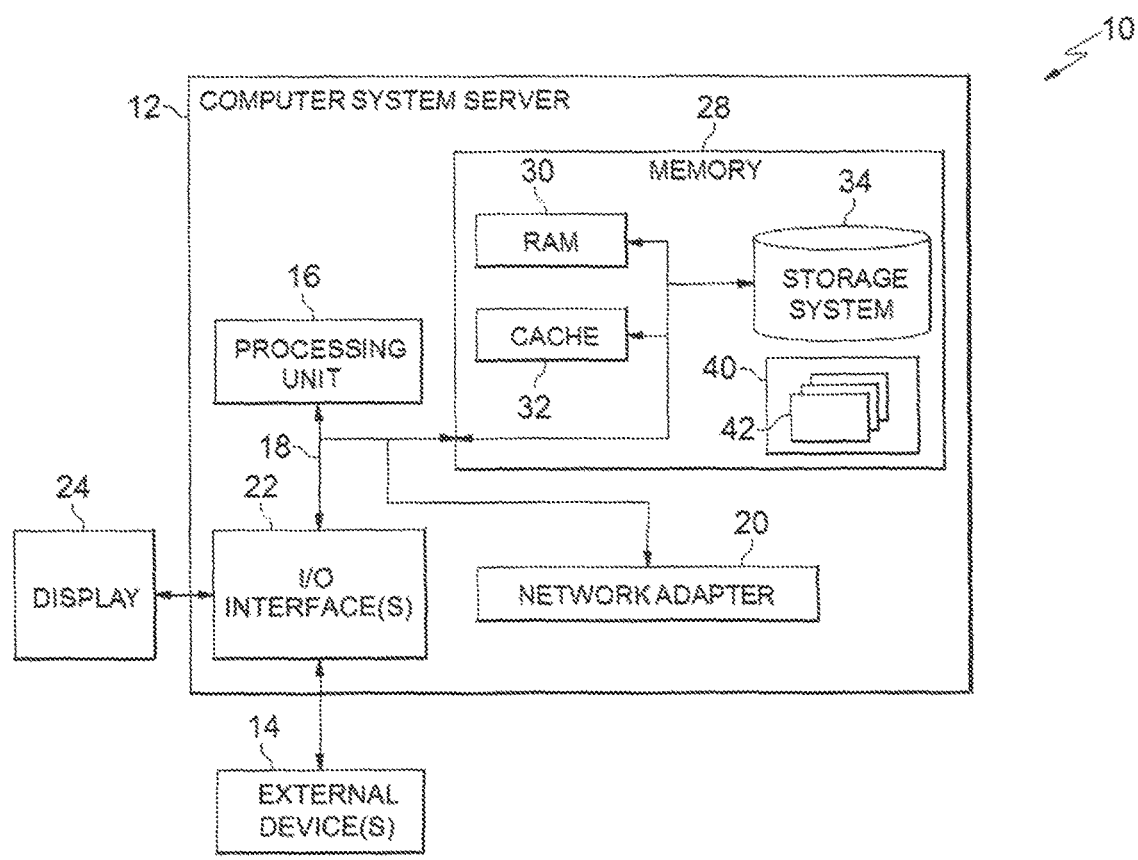
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
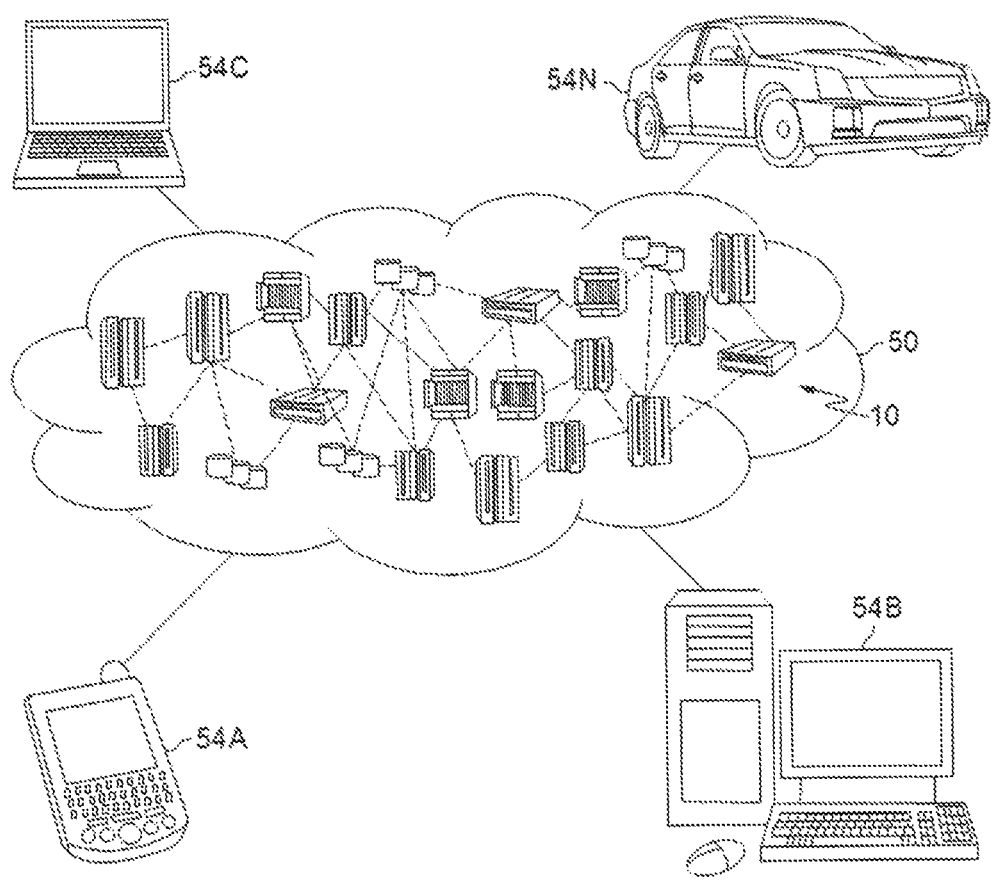
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
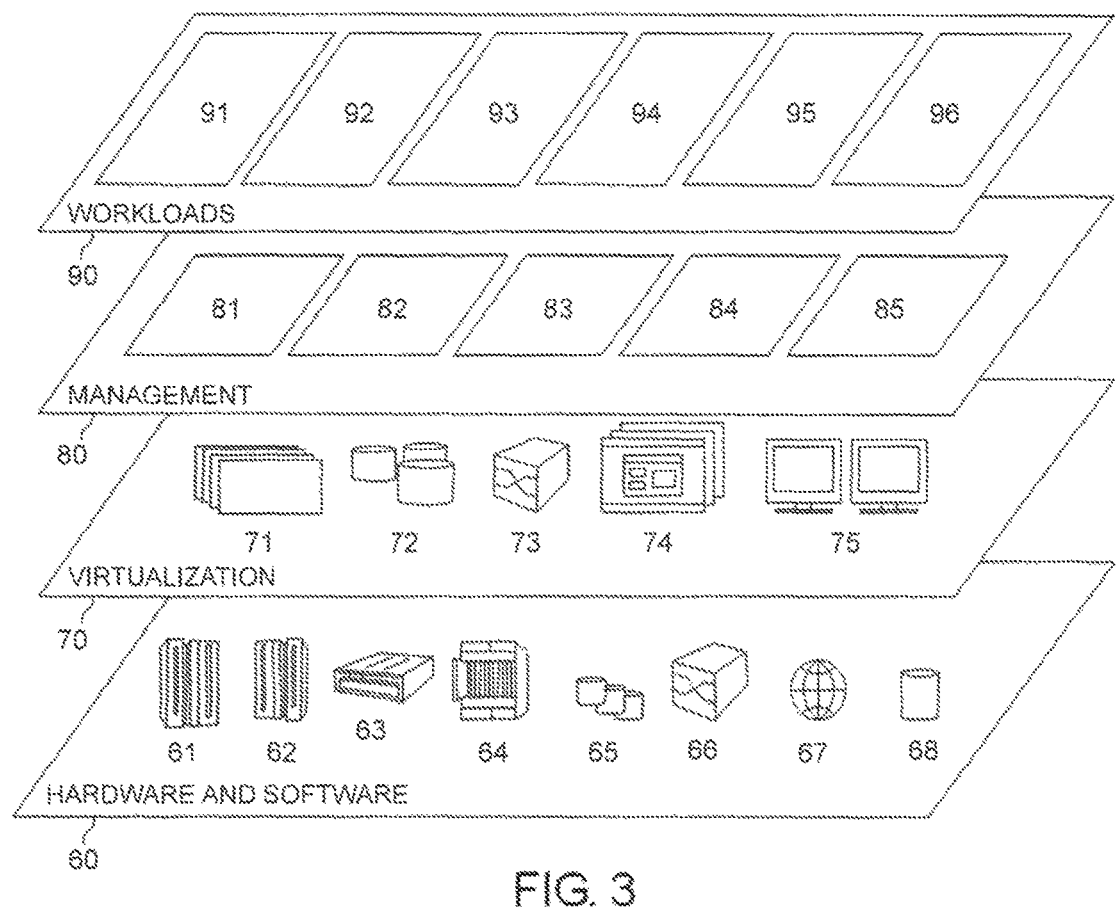
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and change detector/model updater 96.

According to this invention, a system and method is provided to close the loop between infrastructure orchestration templates and existing instantiations of a specific template such that any changes made to one or more instantiations provisioned for a particular template can be evaluated, defined and be automatically and reliably applied to the template, which ensures that existing stacks continue to be supported by a template by limiting the number of changes made to a stack after instantiation from a template. The system is able to define the changes in the appropriate definition language used by the template (for example, YAML).

In one embodiment of the present invention, a software solution is utilized to manage an infrastructure template configuration life-cycle. The system provides a method to provision a stack from an existing template, detect changes, define changes, validate the stack configuration changes to ensure the configuration's relevancy to the template, and, when required, apply the changes to the template. Changes are detected because, for example, the changes will either change the configuration of existing components in the stack (e.g. increasing memory for a VM) or add a new interconnected component (e.g. inserting a firewall between a web server and an application server).

As mentioned previously, templates are typically text files being executed by an engine to generate a stack and associated configuration. The HEAT template from OpenStack is an example of such an embodiment. Presently, a problem is that it is not possible for a system to automatically infer the resulting configuration that a template can generate. To overcome this problem inherent in the prior art, the present invention utilizes the provisioning engine using, for example, aspect-oriented techniques to dynamically build a repository that maintains the relationship between generated system configuration elements and sections of template script files.

Once a stack is provisioned, the system receives an entire configuration of the stack. Depending on the environment in which the system is running, the current configuration of a stack could be extracted through one means of multiple means (Discovery tools, Configuration Management database or through a VM introspection mechanism). On reception of the configuration set of a stack, the system begins the detection process. The detection process consists of comparing each configuration element of a stack to the definition stored within the repository of the system. Every configuration delta flagged then becomes a candidate configuration change. A configuration element not found within the repository is automatically considered a change. Whenever a change is detected, the system matches the change to the component of the template the change is related to. The system also validates if the change is present in a sufficient amount of stack instances to be worthy of an inclusion within the template. In one embodiment, the system allows an administrator to manage the list of rules that constitute a relevant change.

Once changes are deemed relevant for inclusion, depending on the type of change (new configuration element versus modification of an existing configuration) the system either adds a new portion to define the new configuration element template or the system updates the relevant section of the template file. Finally, to ensure the validity of the template modification, the system provisions a test stack and compares the resulting configuration to the repository to ensure that the template is still healthy.

The present invention will now be described in detail with reference to Figures.

Figure 4:
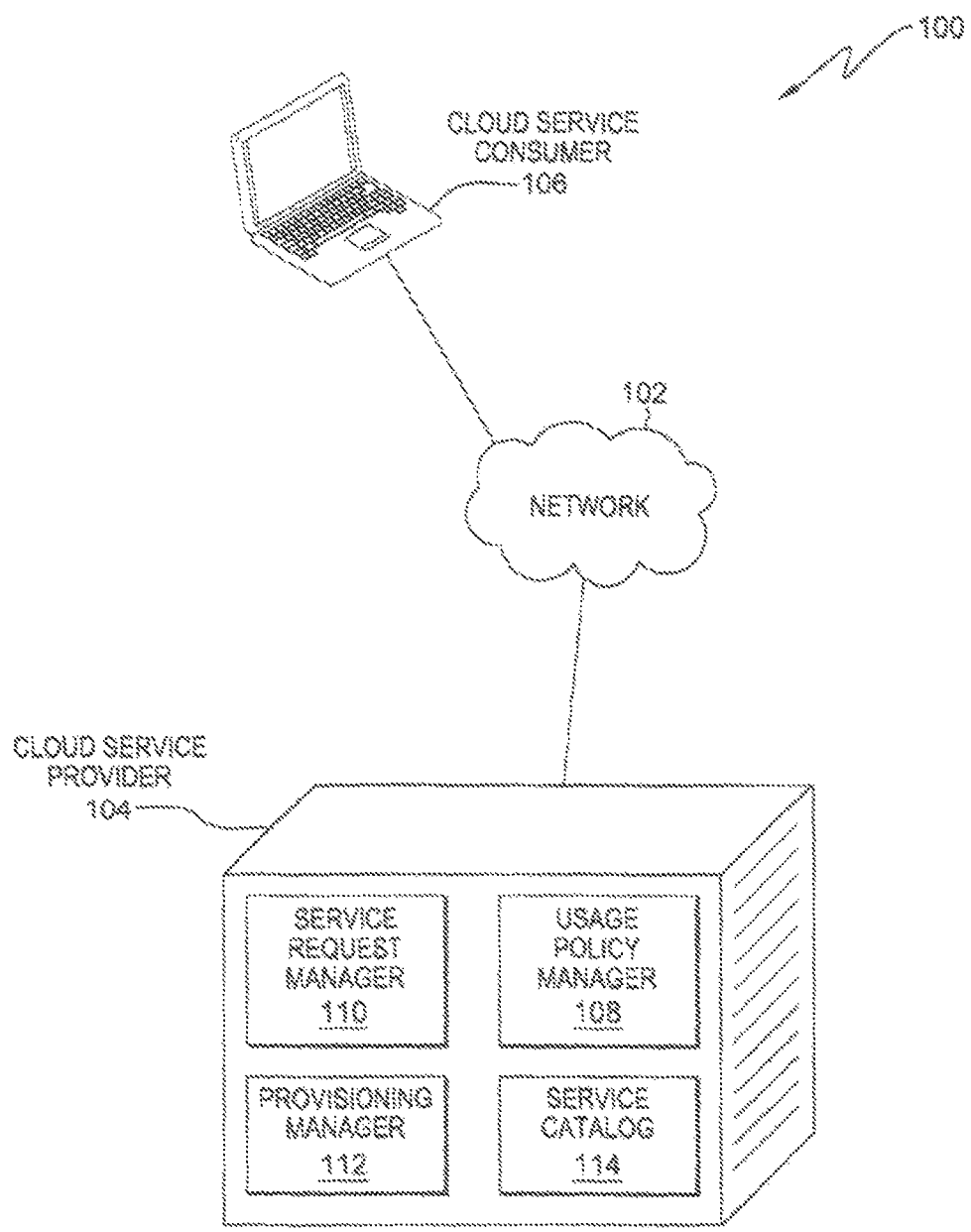
FIG. 4 illustrates a data processing environment including a network, a cloud service provider, and a cloud service consumer, in accordance with an embodiment of the present invention.

FIG. 4 illustrates a data processing environment 100, including a network 102, a cloud service provider 104, and a cloud service consumer 106, in accordance with an embodiment of the present invention.

Network 102 may be the Internet representing a worldwide collection of networks and gateways that use TCP/IP protocols to communicate with one another. Network 102 may include wire cables, wireless communication links, fiber optic cables, routers, switches and/or firewalls. Cloud service provider 104 and cloud service consumer 106 are interconnected by network 102. Network 102 can be any combination of connections and protocols capable of supporting communications between cloud service provider 104 and cloud service consumer 106. Network 102 may also be implemented as a number of different types of networks, such as an intranet, a local area network (LAN), a virtual local area network (VLAN), or a wide area network (WAN). FIG. 4 is intended as an example, and not as an architectural limitation for the different embodiments.

Cloud service provider 104 may be, for example, a server computer system such as a management server, web server, or any other electronic device or computing system capable of sending and receiving data. In one embodiment, cloud service provider 104 may be a data center, consisting of a collection of networks and servers providing an IT service, such as virtual servers and applications deployed on virtual servers, to an external party. In another embodiment, cloud service provider 104 represents a "cloud" of computers interconnected by one or more networks, where cloud service provider 104 is a computing system utilizing clustered computers and components to act as a single pool of seamless resources when accessed through network 102.

Cloud service provider 104 may include a usage policy manager 108, a service request manager 110, a provisioning manager 112, and a service catalog 114. In the exemplary embodiment, usage policy manager 108 is a software-based service program, visualized through a web page accessed through a browser, for defining a cloud service usage policy to optimize allocation of one or more cloud service resources provided by a cloud service provider, such as cloud service provider 104, to reduce costs incurred by a cloud service consumer, such as cloud service consumer 106. In one embodiment, usage policy manager 108 is implemented as a software-based service program within cloud service provider 104. Usage policy manager 108 is deployed as a cloud service provisioned by a cloud service provider, such as cloud service provider 104. For example, usage policy manager 108 may function as a cloud service requested by a cloud service consumer, such as cloud service consumer 106, to manage how the cloud service consumer utilizes one or more cloud services provisioned by one or more other cloud service providers (not shown). In an embodiment, usage policy manger 108 may be a software-based service program provided as a cloud service through a third party cloud service provider (not shown). In yet another embodiment, usage policy manager 108 may include a plurality of usage policy managers capable of communicating with one another to optimize allocation of one or more cloud service resources provided by a plurality of cloud service providers. A plurality of usage policy managers may be interconnected, forming different layers of usage policy managers.

Service request manager 110 may be a software-based program responsible for processing cloud service requests from a cloud service consumer, such as cloud service consumer 106. Service request manager 110 receives a cloud service request from a cloud service consumer, such as cloud service consumer 106, containing information relating to the type of cloud service requested. In one embodiment, the cloud service request contains a selection of services, and information related to the selection of services, including, but not limited to, a type of service, one or more components of the service, duration of the service, etc. For example, service request manager 110 may receive a cloud service request for a virtual server, configured to operate on Linux®, and including one or more components, such as a database, an application server, and a development tool, for a time period of six months. In an embodiment, service request manager 110 is responsible for decomposing the cloud service request, wherein decomposing the cloud service request includes identifying the selection of services and information related to the selection of services and defining the selection of services as a metadata model, represented as XML data, for processing by a provisioning manager, such as provisioning manager 112. In an embodiment, service request manager 110 sends the selection of services and information related to the selection of services to provisioning manager 112 as instructions for providing applications, platforms, and infrastructure to fulfill the cloud service request.

Provisioning manager 112 may be a software-based program responsible for provisioning applications, platforms, and infrastructure to fulfill a cloud service request. For example, provisioning manager 112 may provision a virtual network, a storage device, a platform, an operating system, an application, and a web server into a managed cloud program (not shown) within cloud service provider 104 to establish a cloud service that fulfills a cloud service request.

Service catalog 114 may be a catalog including a plurality of options, services, provisions, and infrastructure offered by a cloud service provider, such as cloud service provider 104. A cloud service consumer, such as cloud service consumer 106, can make selections from service catalog 114 when subscribing to a cloud service.

Cloud service consumer 106 may be a client to cloud service provider 104, and may be, for example, a desktop computer, a laptop computer, a tablet computer, a personal digital assistant (PDA), a smart phone, a thin client, or any other electronic device or computing system capable of communicating with cloud service provider 104 through network 102. Cloud service consumer 106 includes a processor (not shown) and one or more data storage devices (not shown). The processor can be any custom made or commercially available processor, a central processing unit (CPU), an auxiliary processor among several processors associated with the computer, a semiconductor based microprocessor, a macro processor, or generally any device capable of executing instructions. The one or more data storage devices can be at least one storage device of the random access memory (RAM), read only memory (ROM), a cache, a stack, or the like that can temporarily or permanently store electronic data. In the exemplary embodiment, cloud service consumer 106 includes an internet browsing program (not shown) for communicating securely with cloud service provider 104, and provides respective user interfaces for viewing and communicating with the cloud service provider via a web page, a web portal, etc.

Data processing environment 100 may include additional cloud service providers, third party cloud service providers, cloud service consumers, displays, and other devices not shown.

Cloud service provider 104 and cloud service consumer 106 each maintain respective internal components, and respective external components. In general, cloud service provider 104 and cloud service consumer 106 can be any programmable electronic device.

Figure 5:
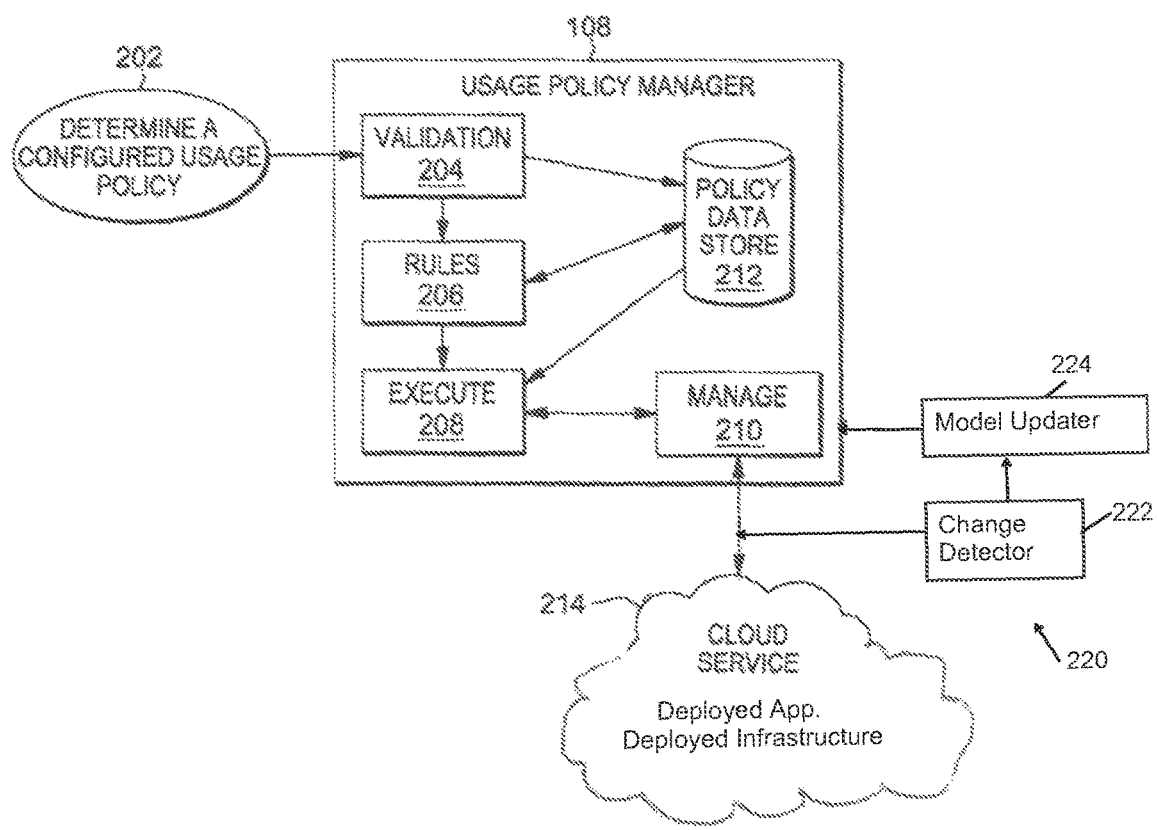
FIG. 5 is functional block diagram depicting the steps of a usage policy manager for defining a cloud service usage policy, in accordance with an embodiment of the present invention.

FIG. 5 is functional block diagram depicting the steps of usage policy manager 108 for defining a cloud service usage policy, in accordance with an embodiment of the present invention. Usage policy manager 108 determines a configured usage policy (202). In the exemplary embodiment, usage policy manager 108 determines a configured usage policy from a cloud service consumer, wherein the configured usage policy can be used to create a new usage policy. The configured usage policy includes a set of parameters and one or more parameter values. For example, the configured usage policy may include, without limitation, information on one or more associated physical resources of a cloud service, a timeframe or duration when the cloud service will be consumed, one or more policy driven rules for governing usage of the cloud service, a usage pattern, a number of users, and a number of machines. In another embodiment, usage policy manager 108 may update an existing configured usage policy. For example, usage policy manager 108, in response to a request to update an existing configured usage policy from a cloud service consumer, such as cloud service consumer 106, may retrieve the existing configured usage policy from policy data store 212, and update the existing configured usage policy according to updated parameters provided by the cloud service consumer, or by environmental factors, such as an actual usage pattern. In yet another embodiment, usage policy manager 108 may delete an existing configured usage policy. For example, usage policy manager 108, in response to a request to delete an existing configured usage policy from a cloud service consumer, such as cloud service consumer 106, may retrieve the existing configured usage policy from policy data store 212, and delete the existing configured usage policy.

Usage policy manager 108 validates the configured usage policy 204. In the exemplary embodiment, usage policy manager 108 validates the configured usage policy by rendering the configured usage policy as a metadata model, describing the configured usage policy syntax and semantics. Usage policy manager 108 determines whether the configured usage policy is understandable semantically; i.e., that the configured usage policy is executable by a cloud service provider. For example, where a cloud service consumer selects a timeframe for usage during a date in time that has already past, for instance May 8, 2013, and the cloud service consumer has selected to utilize 6 servers, when only 4 are available, usage policy manager 108 may determine that the configured usage policy is not executable, and therefore invalid, as configured.

In an exemplary embodiment, usage policy manager 108 stores a valid configured usage policy in policy data store 212 as XML data. A configured usage policy in policy data store 212 can be accessed by usage policy manager 108 at any time to update the configured usage policy, re-apply the configured usage policy within an additional cloud service, or delete the configured usage policy, thereby returning the cloud service provider to a default mode of operation with respect to billing and usage of a provided cloud service.

Usage policy manager 108 determines rules for governing the configured usage policy (206). In the exemplary embodiment, usage policy manager 108 determines one or more rules for governing the configured usage policy that reflect the parameters and parameter values selected by a cloud service consumer when configuring the usage policy. Usage policy manager 108 can determine the one or more rules based on one or more factors, including, without limitation, a cost billed to a cloud service consumer for using a cloud service, a projected usage pattern with respect a cloud service, an actual usage pattern with respect a cloud service, and a complexity of a cloud service, etc.

In one embodiment, usage policy manager 108 stores the one or more rules for a configured usage policy in policy data store 212. Usage policy manager 108 can access the one or more rules associated with a configured usage policy in policy data store 212 at any time to update the one or more rules, re-apply the one or more rules to an additional configured usage policy for an additional cloud service, or delete the one or more rules, thereby returning the cloud service provider to a default mode of operation with respect to billing and usage of a provided cloud service.

In another embodiment, usage policy manager 108 may determine default rules to govern the configured usage policy. For example, where a cloud service consumer did not provide sufficient information for a configured usage policy to determine a rule, usage policy manager 108 may determine a default rule, such as bill per unit, bill per period of time, or bill per number of users.

Usage policy manager 108 executes the configured usage policy 208. In the exemplary embodiment, usage policy manager 108 executes the configured usage policy at runtime. Usage policy manager 108 reads the configured usage policy from policy data store 212, instantiates the configured usage policy into memory, and processes it according to one or more usage policy rules of rules 206, previously established for the configured usage policy. Usage policy manager 108 controls the allocation of IT resources to a particular task during execution.

Additionally, policy manager 108 manages the cloud resources 210. For example, the usage policy manager 108 manages the cloud resources during runtime according to configured usage policy and associated rules being executed. Usage policy manager 108 further monitors the cloud service resources of a cloud service, such as cloud service 214, to manage the allocation of those resources in accordance with the usage policy.

In accordance with the invention, a change detection module 220 is employed to monitor usage and to detect changes in the workloads, including the deployed application and the deployed infrastructure, to update the model which was used to provision the workloads. The change detection module includes a change detector 222 and a model updater 224 which will be described in more detail below.

Figure 6:
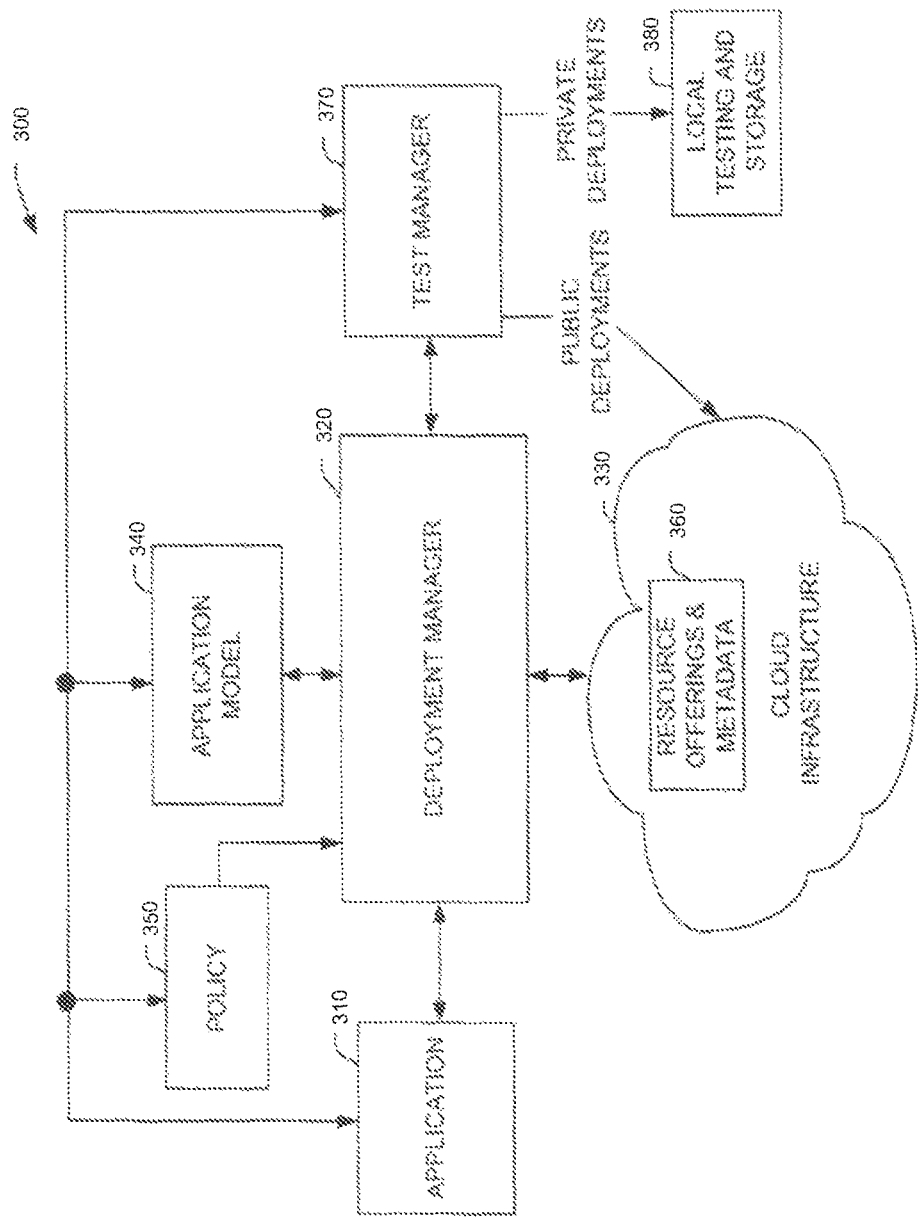
FIG. 6 illustrates an example of a system that provides automated test management, staging, and deployment for applications, in accordance with an embodiment of the present invention.

FIG. 6 illustrates an example of a system 300 that facilitates automated test management, staging, and deployment for cloud applications, in accordance with an embodiment of the present invention. The system 300 can provide automated deployment and life cycle management of an application 310 by utilizing a deployment manager 320 to determine infrastructure capabilities of a cloud infrastructure 330 (also referred to as cloud 330) and also determine application requirements of the application 310 by, for example, analyzing an application model 340 and policy 350. Although a cloud 330 is shown, deployment, staging, and test as described herein can be applied to non-cloud environments as well (e.g., local databases and servers). After proper determination by the deployment manager, the deployment manager 320 can automatically manage the lifecycle of the application 310 on the cloud 330, wherein matches are identified (e.g., ideal or best effort—closest match). Based on a measure of closeness in the matching, and/or other policy requirements a match is selected and the infrastructure can be provisioned and instantiated.

After the matching of resources (e.g., an absolute or closest match) to application requirements, then the components of the application 310 can be deployed on the cloud 130 (or non-cloud local execution environment). Infrastructure capabilities of the cloud 330 can be determined via resource offerings and metadata 360 associated with the cloud. For instance, a plurality of service providers supporting the cloud 330 can provide files that specify what types of resources the providers have available and metadata that describe properties of interest for the respective resource offerings (e.g., resource offering of three servers available with metadata specifying memory size and processor speeds, load (if already instantiated), location, tenancy terms, service level agreements (SLAs), scheduled maintenances, and so forth).

A test manager 370 may be provided to configure and launch a test suite of application deployments for the given application 310 via the deployment manager. The test manager 370 can configure a plurality of tests associated to a plurality of different operational deployment scenarios for the application 310. The configuration and resultant application deployments can be administered across organizational boundaries to suit various organizational needs.

The test manager 370 enables automated development testing, development for operations, and application security development, for example, based on determining best matching infrastructure by matching of application models 340 and policies 350 to infrastructure models as specified by the resource offerings and metadata 360. The security development example is provided only by way of example and is not intended to limit the scope of the present invention as described below. Application models 340 can be specified for specific deployments or tests. When selecting which model to use, selection can be achieved via selecting from different models in a set of models or via matching of a label associated to different model types specified in policy, for example. The matching infrastructure can then be employed to test or facilitate production staging while also running various test suites and at different stages of testing (and/or monitoring at production stages). For development testing, the test manager 370 allows developers to follow development of any software with tests in the cloud 330 where the manager can deploy and run the software in multiple deployment scenarios and execute target test cases without the usual delays and cost to setup deployment and test. After developing and testing of software elements (e.g., applications components), the software elements can then be deployed and operated in production (and monitored similarly). The deployment enables also testing security aspects of the application 310 since security can also be tested in a secure development and production environment such as on the local testing and storage 380. Feedback of bugs, security breaches and other detected events can be easily monitored and fed back (e.g., via monitor components and listeners) to development agents such as for diagnostics and repair. When problems are reported in production, the deployment conditions and context can be reproduced with a bug/problem report for developers (or support) to diagnose and correct) which can then lead to test and patch/updates which can then be staged and/or tested.

The test manager 370 and deployment manager 320 can be employed to automate testing in accordance with a user interface (UI) for configuration and launch of test suites on deployments provisioned and deployed by the deployment manager 320, which can include providing automated application programming interfaces (APIs) which can be automated based on monitoring changes in coder repository and launching/running test suites on deployments provisioned and deployed by the deployment manager 320. The deployment manager 320 can be used to move from testing to production which can be initiated by policy changes in terms of location (in production zone) and other production criteria on capacity, delays, quality of service (QoS), and so forth. Other testing scenarios supported by the test manager 370 can include security development, operations development, and quality assurance that can be supported by configured monitoring and closed loop feedback of infrastructure. The results of such development testing for a given application can be utilized by the deployment manager 320 for deployment and lifecycle management for the given application. Continuous integration of application components (e.g., integrated with existing applications they are developed and stored in a repository) can be supported as they are developed based on the deployment manager 320. Continuous delivery of software can also be supported based on the automated actions of the deployment manager 320.

The cloud 330 can be a hybrid such that it can be a combination of traditional Data Centers that are made to behave like infrastructure resources, private clouds (cloud technology developed on premise), public clouds (offered by service providers and managed cloud configurations (managed on premise or in a public cloud/virtual private cloud). As used herein, the term application applies to a collection of components. In addition, the application can be characterized for each of its components by a set of artifacts (e.g., installer, executable, configurations and so forth, and a set of components that are installed and interact with each other (e.g., code, middleware (MW), databases, operating system (OS), and so forth). Also, as used herein, the term determining can include compiling, enumerating, and matching.

For purposes of simplification of explanation, in the example of FIG. 1, different components of the system 300 are illustrated and described as performing different functions. However, a person of ordinary skill in the art will understand and appreciate that the functions of the described components can be performed by different components, and the functionality of several components can be combined and executed on a single component. The components can be implemented, for example, as computer executable instructions, hardware (e.g., an application specific integrated circuit or a processing unit), or as a combination of both. In other examples, the components could be distributing among remote devices across a network.

Figure 7:
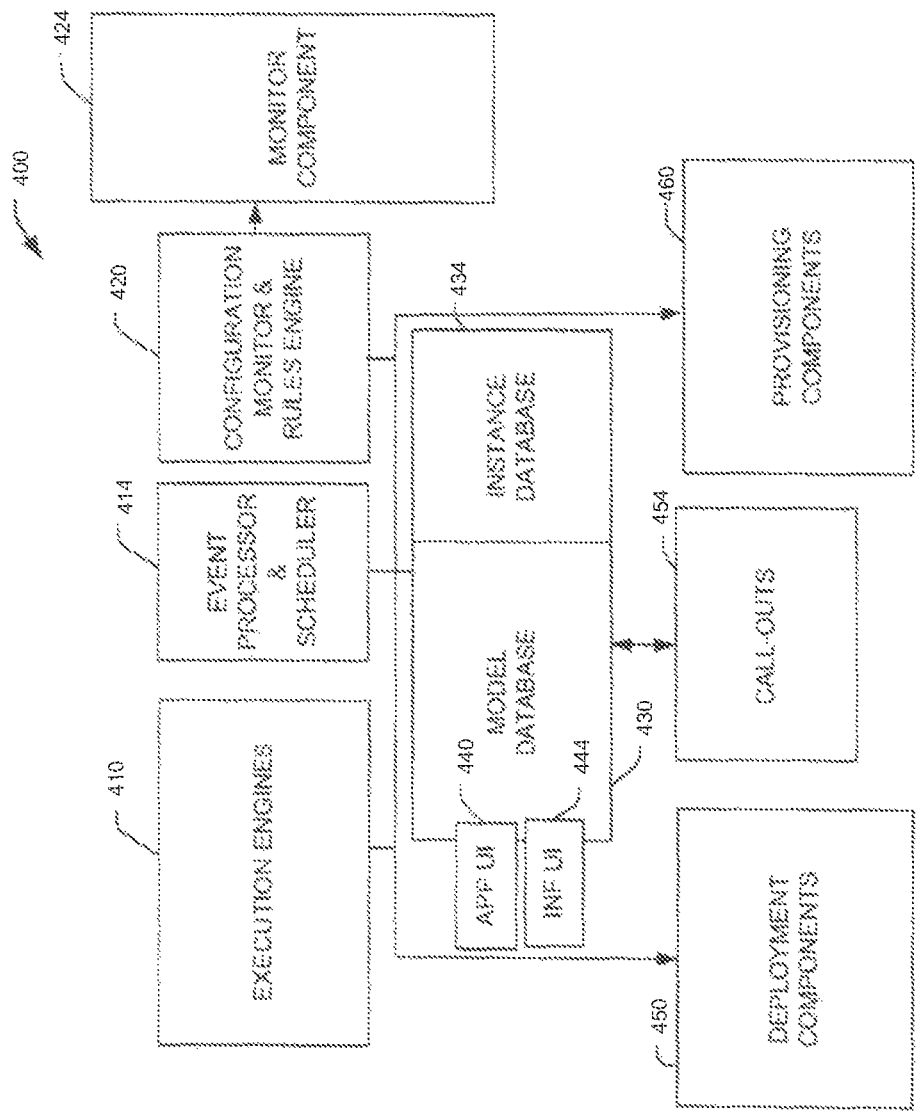
FIG. 7 illustrates an example system for automated deployment and monitoring of applications, in accordance with an embodiment of the present invention.

FIG. 7 illustrates an example system 400 for automated deployment and monitoring of applications, in accordance with an embodiment of the present invention. The system 400 includes execution engines 410 for automated deployment of applications. Such engines can also include provisioning managers for establishing service level agreements with service providers and can include the deployment manager described above. An event processor and scheduler can 414 can be utilized for processing application events and scheduling tasks associated with the application. As disclosed herein, listeners/handlers can be defined and installed for monitoring events, which can include scheduling the provisioning and deployment and follow-up lifecycle management operations (e.g. tonight or deploy for next 2 weeks). A configuration monitor 420 and rules engine can be employed for configuring a monitor component 424 which provides feedback from an application and for applying rules and policies for executing the application. The system 400 includes a model database 430 that can include application models, infrastructure models, and artifact pointers, for example.

An instance database 434 can be employed to store realized target instances of the application. An application user interface 440 can be employed to design the application and configure metadata for operating the application, whereas an infrastructure user interface 444 can be employed to specify infrastructure requirements for deploying the application in the cloud. Deployment components 450 can include a deployment application programming interface (API) and instructions such as may be specified via a deployment recipe, for example. One or more call-outs 454 can specify customized operating instructions for a given application. Provisioning components 460 can include a provisioning API and plug-ins for interacting with various cloud infrastructure components.

The system 400 can be utilized as a designer tool to build/deploy infrastructure and application templates, which also allows application developers, testers, or other administrators or designers to build application models. Similarly, administrators can design policies and rules for execution and deployment of an application. Some or all of the infrastructure and application data can be ingested into the repositories shown as database 430 and 440, respectively. Alternatively, such infrastructure or application data can be passed via APIs. Application artifacts (code, executable, installation packages, and the like) can be also ingested or referred to via the databases or API's. The APIs or portal user interfaces 440 and 444 can be used to associate or upload requests to match and deploy while also specifying application templates and policies to use, for example. Such APIs and user interfaces can be implemented as part of a designer tool to define metadata and associate the metadata to infrastructure (e.g., via infrastructure templates and topologies).

Figure 8:
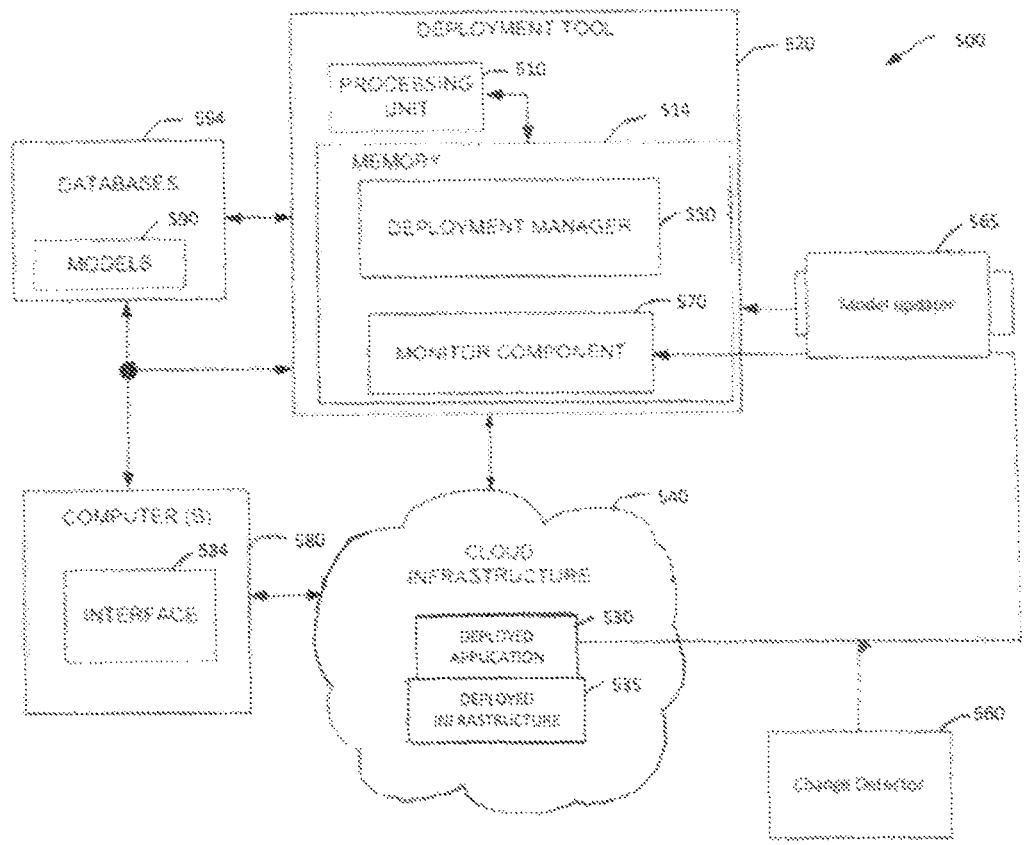
FIG. 8 illustrates an exemplary system for deployment and management of applications in a cloud infrastructure and incorporating elements of the present invention, in accordance with an embodiment of the present invention.

FIG. 8 illustrates an exemplary system 500 for deployment and management of applications in a cloud infrastructure and incorporating elements of the present invention, in accordance with an embodiment of the present invention. The system 500 includes a processing unit 510 (or processor) that executes instructions from a memory 514 that includes firmware or other storage media for storing computer executable instructions associated with a computer. The processing unit 510 and memory 520 can be provided as part of a deployment tool 520 that deploys an application 530 on a cloud infrastructure 540 via a deployment manager 550. As shown, the cloud infrastructure 540 includes deployed applications 530 and deployed infrastructure 535 which are monitored by a change detector 560 that provide change information to model updater 565, whereby the information provided by the change detector 560 and model updater 565 are processed by a monitor component 570. Change data from the change detector 560 can be status or events from the deployed application 530 and/or deployed infrastructure 535 which indicate how the application and/or infrastructure is/are executing.

A computer 580 can operate one or more interfaces 584 to program application models 590 and stored in databases 594. The computer can also interact with the deployment tool 520 to alter deployment and facilitate lifecycle management of applications. The interfaces 584 can also configure infrastructure templates, alter operating requirements, configure the monitor component 570, and interact with events and alerts that are generated within the system 500. As noted previously, along with being executed on the cloud, the deployed application 530 and deployed infrastructure 535 can be spread across unrelated clouds or provided as part of a hybrid application. For example, the deployed application 530 could be executed in part on the cloud infrastructure 540 and in part on the databases 594 which are a different entity (e.g., local server databases versus network databases) than the cloud.

The method can be automatically executed as part of a system such as the example depicted in FIGS. 4 to 8. The system can include a memory for storing computer executable instructions associated with a computer and a processing unit for accessing the memory, executing the computer executable instructions, and thereby performing the method. The computer executable instructions can include an application model stored in the memory to characterize a given application for deployment on a cloud infrastructure, wherein the application model can be described by application metadata. A deployment manager stored in the memory can analyze the application metadata for the given application and a policy associated with the given application to determine infrastructure resources in the cloud infrastructure. The infrastructure resources can be specified as resource metadata. The deployment manager can automatically substantially match (e.g., identify a closest match) the application metadata with the resource metadata to fulfill an application requirement. A test manager can be stored in the memory to configure and launch a test suite of application deployments in the cloud for the given application via the deployment manager. A monitor component can monitor test conditions from deployment of the given application in the cloud and to provide feedback for the given application corresponding to the monitored test conditions.

This disclosure describes a system and method to close the loop between infrastructure orchestration templates and existing instantiations of that template such that any changes made to one or more instantiations provisioned for a specific template can be evaluated and be defined and automatically/reliably applied to the template, which ensures that stacks out there continue to be supported by a template by limiting the number of changes made to a stack after instantiation from a template.

Figure 9:
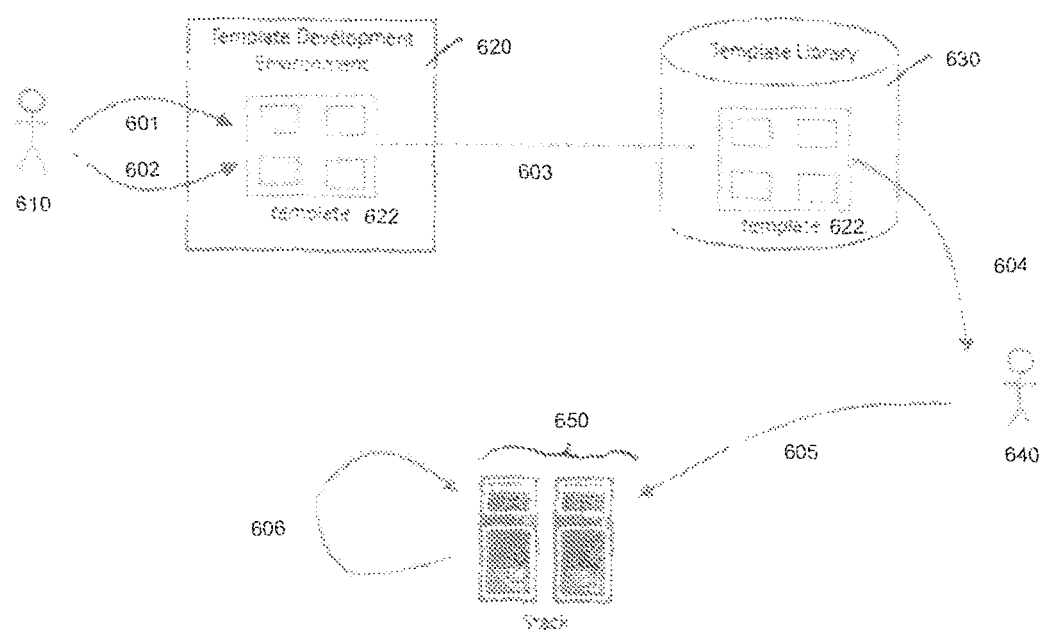
FIG. 9 illustrates schematically the lifecycle of a template, in accordance with an embodiment of the present invention.

FIG. 9 illustrates schematically the lifecycle of an exemplary template, in accordance with an embodiment of the present invention. At steps 601 and 602, a template author 610 creates and updates templates 622 which are stored in a template development environment 620 which are later at step 603 published to a template library 630. At step 604, the template consumer 640 retrieves or pulls select templates 622 from the template library 630 for use in any number of personal and/or business environments. The template consumer 640 then at step 605 provisions and instantiates the template to a stack 650 where the template is stored.

As described above, in order to provide cloud services, an organization may employ a cloud service manager or deployment manager 320 of FIG. 6 to offer and deliver (e.g., instantiate, provision, and deploy) services to manage the lifecycles of cloud services for end users. As used herein, managing the lifecycles of cloud services can include managing the building of a cloud service, ongoing management of an existing cloud service, reporting, metering, and/or auditing, for example. More particularly, a cloud service manager can orchestrate the use of application programming interfaces (APIs) of existing cloud services for managing the lifecycles of the existing cloud services and combinations of the existing cloud services for users of end systems (e.g., desktops, portable computers, smartphones, clients, thin clients, servers). A cloud service provisioning system can include and/or be in communication with a design component configured to create a service design for a cloud capability. The design component can be separate from the provisioning system and understood by a cloud service manager and can be able to reflect resources, offerings, etc. that a controller can provide. A service design can include a set of actions to instantiate the cloud capability as well as a collection of resources to be utilized in the instantiation of the cloud capability. An instantiation can include an instance of the capability (e.g., a deployed instance, an executed instance, etc.).

The method and system according to the present invention will instrument the provisioning engine using aspect-oriented techniques to dynamically build a repository that will maintain the relationship between generated system configuration elements and sections of template script files.

Once a stack 650 is provisioned, the system may receive the entire configuration of the stack 650. In one embodiment, depending on the environment in which the system is running, the current configuration of the stack 650 may be extracted through one means of multiple means; e.g., discovery tools, a configuration management database and/or through a VM introspection mechanism as will be understood by those of skill in the art.

On reception of the configuration set of the stack 650, the system would begin the detection process. The detection process would consist in comparing each configuration element of the stack 650 to the definition stored within the repository of the system. Every configuration delta that is flagged would then become a candidate configuration change. In one embodiment, the system would account for the situation where configuration values are parameterized so that no 'false' changes are detected. A configuration element not found within the repository would be automatically considered a change.

Whenever a change is detected, the system would match it to the component of the template the change is related to. The system would also validate if the change is present in a sufficient amount of stack instances to be worthy of an inclusion within the template. It is expected that the system would allow an administrator to manage the list of rules that constitute a relevant change.

Once changes are deemed worthy of inclusion, depending on the type of change (e.g., new configuration element versus modification of an existing configuration) the system either would add a new portion to define the new configuration element template or it would update the relevant section of the template file at step 606. Additionally, to ensure the validity of the template modification, the system may provision a test stack and compare the resulting configuration to the repository to ensure that the template is still healthy.

The steps 601 through 606 described above provide a unique system for monitoring, detecting and recording changes between infrastructure orchestration templates and existing instantiations of a specific template such that any changes made to the possibly many instantiation out there for a particular template can be evaluated and be automatically and reliably applied to the template.

There are endless examples where the present invention may be invoked. One example where the system and method of this invention would be beneficial to cloud computing includes a scenario where an infrastructure architect or policy manager needs to provision a new Cloud Service to support a business need. The Infrastructure Architect typically selects the service they require from a services catalog; e.g. service catalog 114 provides an option whereby the infrastructure architect selects Service A1: "Simple Web App", which is defined through a template description. The Template for "Simple Web App" is defined as three interconnected virtual servers (v1, v2 and v3): where v1 includes a Linux Operating System and a Web server (for example IBM HTTP Server); v2 also includes a Linux Operating System and an Application Server (for example WebSphere Application Server); and v3 also includes a Linux Operating System and a database server (for example DB2). Virtual servers v1, v2 and v3 are defined in the template as being interconnected (e.g., v1 web server is integrated with v2 application server; v2 application server is integrated with v3 database server). The request is made, and the cloud provisioning system processes the template. The cloud provisioning system provisions the servers, creates an instance of the "Simple Web App" service, and notifies the service requester (the Infrastructure Architect) by an email, which includes a URL directing the infrastructure architect to Service A1.

The service request is complete, and the cloud provisioning system now manages the service. The business begins to build, deploy and test the business' application running on Service A1. Later in time, the infrastructure architect is informed that the service is not working properly. While testing, the users determine that web orders can no longer be processed and the system appears as if it has failed. Upon further debugging and diagnosis (hours or days), it is determined that security had decided to separate the application server on v2 from the database server on v3 with a firewall for enhanced security and network isolation (e.g., separating the networks), whereby the firewall (e.g., a software virtual firewall) has been installed by a security team in accordance with new corporate policy without informing the infrastructure architect or the user(s). The installation process did not affect ServiceA1 because the firewall rules were applied instantaneously. However the failure was caused because the firewall crashed. The firewall crash meant that the application server on v2 could not "see" or could no longer connect to the database server on v3. As a result, the firewall was rebooted and patched and this resolved the error and reestablished connectivity between the application server v2 and the database server v3. However, with conventional systems and methods, the error and failure would not be avoided in the future provisioning processes.

The present invention seeks to avoid the above problem by saving the necessary changes make their way to the existing instantiations (stacks) of the template in an automated and reliable way. Following the previous example, the present invention would proceed as follows: Again, an infrastructure architect needs to provision a new Cloud Service to support a business need. Again, the infrastructure architect would select the service they require from a services catalog, for example, the infrastructure architect would select ServiceA1: "Simple Web App", which is again defined through a template description. Again, the template for "Simple WebApp" is defined as three inter-connected virtual servers (v1, v2 and v3): v1 includes a Linux Operating System and a Web server (for example IBM HTTP Server); v2 also includes a Linux Operating System and an Application Server (for example Web Sphere Application Server); and v3 also includes a Linux Operating System and a database server (for example DB2). Virtual servers v1, v2 and v3 are defined again in the template as being interconnected (v1 web server is integrated with v2 application server; v2 application server is integrated with v3 database server). Again, the request is made, and the cloud provisioning system processes the template, provisions the servers, and creates an instance of the "Simple Web App" service. Again, the cloud provisioning system notifies the service requester (the Infrastructure Architect) by an email, which includes a URL directing him/her to ServiceA1.

When the Service request is complete, the cloud provisioning system again manages the service. The business again begins to build, deploy and test their business application running on ServiceA1. Next, according the present invention, changes to the Service configuration are detected; i.e., the present invention detects that a virtual firewall has been installed and network isolation changes have been made. These changes are captured and recorded by the present invention. The changes captured will be converted into an appropriate executable language (for example, YAML). The present invention will then update the template for ServiceA1 with the configuration changes captured in an appropriate executable language. According to the invention, a new version of ServiceA1 is produced (e.g. Service A2), and Service A2 will supersede Service A1 as the current version of Service A. The cloud management system now understands there is a firewall deployed as part of Service A2 and the cloud management system can now monitor that firewall as part of Service A2 and detect any subsequent failures. The cloud management system will now provision all new instances of Service A2 with a firewall, in conformance with corporate security policies.

In another example, it is to be assumed that a pattern gets provisioned, for example, a pattern for deploying RedHat 6.5 on Linux and the pattern is used to provision 100 virtual machines (VMs). Over time, the VMs experience changes. For example, some VMs have the 'file limit' modified, other VMs may have a library added to them, which was not in the original pattern, etc.

The discovery process defined by the present invention will collect, cleanse and consolidate the changes that have happened to the VMs provisioned from the pattern. The pattern update process as defined by the present invention may result in two other patterns being created—one for 'RedHat 6.5 on Linux New File Limit' another for 'RedHat 6.5 on Linux New Library'. In any event, the cloud management system will now provision all new instances of the pattern.

In another example, a problem commonly experienced is set forth below with an example of the detection and correction process of this invention.

Problem To Be Solved:

A Test Architect triggers a build and test pipeline to ensure that the latest version of a code is ready for release. The build and test pipeline instantiate one hundred (100) instances of the product template to execute specific test cases. At the end of the run, thirty percent (30%) of the test cases report failure. After investigation changes are made to a set of operating system (OS) packages. The test run is resumed and all test cases complete successfully. Then the environment gets de-provisioned. On the next build and test run, 30% of the test case reports failure again, because the original problems, though detected, were not saved backed to the stack. Here, investigation identifies the same set of missing OS packages. The Test Architect must manually retro-actively apply the set of changes to the template to ensure the failure(s) does not occur again.

Solution Proposed By The Invention:

A Test Architect triggers a build and test pipeline to ensure that the latest version of a code is ready for release. The build and test pipeline instantiate one hundred (100) instances of the product template to execute specific test cases. At the end of the run, thirty percent (30%) of the test cases report failure.

After investigation changes are made to a set of OS packages. The test run is resumed and all test cases complete successfully. Here, the present invention detects an additional change to the Operating System package list and updates the template by including deployment of the missing packages. Now, the environment gets de-provisioned. The next build and test run is provisioned and one hundred (100%) of the test cases completes successfully without the manual and retroactive application of the changes as described above.

In one embodiment, the present invention would utilize a software solution that would be in charge of managing an infrastructure template configuration life-cycle. The system would encapsulate a method to provision a stack from an existing template, detect changes, validate the stack configuration changes to ensure its relevancy to the template, and, when required, apply the changes to the template.

Figures 10, 11:
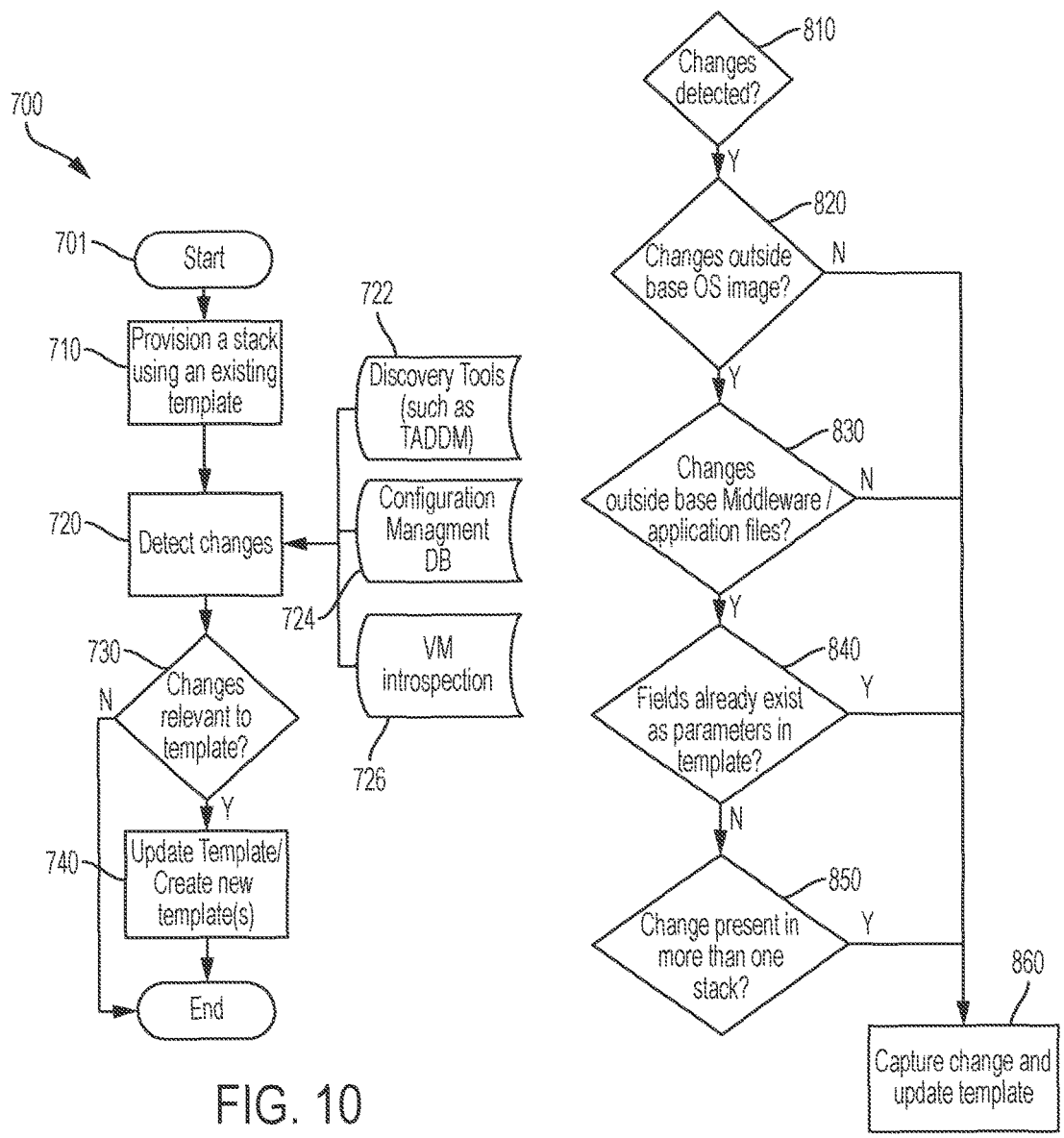
FIG. 10 illustrates a flowchart of steps to accomplish monitoring orchestration templates and existing instantiations of the template in FIG. 9 to detect changes and reapply the changes to the template, in accordance with an embodiment of the present invention.
FIG. 11 illustrates a flowchart showing steps that allow a manager or administrator to manage a list of rules that constitute a relevant change to a template modified in a stack, in accordance with an embodiment of the present invention.

FIG. 10 illustrates a flowchart of steps to accomplish monitoring orchestration templates and existing instantiations of the template at stack 650 to detect changes and reapply the changes to the template 622, in accordance with an embodiment of the present invention. As described above, the system of this invention monitors templates once they have been provisioned to a stack 650 as shown in FIG. 6 at step 606. According to FIG. 10, the system 700 starts the monitoring process at step 701 then provisions a stack using an existing template at step 710.

Once a stack 650 is provisioned, the system 700 may receive the entire configuration of the stack 650. In one embodiment, the current configuration of the stack 650 may be extracted through one means of multiple means; e.g., discovery tools 722, a configuration management database 724 and/or through a VM introspection mechanism 726 as will be understood by those of skill in the art to proceed with the detection step 720.

Extraction or discovery tools, such as TADD, provide automated discovery and application mapping. Such tools help IT administrators understand the structure, status, configuration and change history of their interdependent business applications and IT services. Configuration management (CM) is the detailed recording and updating of information that describes an entity's hardware and software. Such information typically includes the versions and updates that have been applied to installed software packages and the locations and network addresses of hardware devices. Special configuration management software is available as will be understood by those of skill in the art. Virtual Machine Introspection provides an agent-less way to peer into virtual machines and ascertain everything from the VM's physical location (e.g., ESX host) to network settings (e.g., VLAN assignment, IP and MAC addresses) to the installed OSes, patches, applications, and services—typically with negligible performance impact to the physical VM host. In fact, the list of parameters VMI can glean is much longer and continues to grow as APIs evolve.

On reception of the configuration set of the stack 650, the system would begin the detection process at step 720. The detection process would consist in comparing each configuration element of the stack 650 to the definition stored within the repository of the system. Every configuration delta that is flagged would then become a candidate configuration change. In one embodiment, the system would account for the situation where configuration values are parameterized so that no 'false' changes are detected. A configuration element not found within the repository would be automatically considered a change.

Whenever a change is detected, the system would match it to the component of the template the change is related to. The system at step 730 would also validate if the change is present in a sufficient amount of stack instances to be worthy of an inclusion within the template. It is expected that the system would allow an administrator to manage the list of rules that constitute a relevant change at step 730.

Once changes are deemed worthy of inclusion, depending on the type of change (e.g., new configuration element versus modification of an existing configuration) the system at step 740 either would add a new portion to define the new configuration element template or it would update the relevant section of the template file at step 606 as shown in FIG. 6.

As mentioned previously, templates are typically text files being executed by an engine to generate a stack and its associated configuration. The HEAT template from OpenStack is an example of such an embodiment. Thus it is not possible for a system to automatically infer the resulting configuration that a template can generate. To circumvent this problem, the system will instrument the provisioning engine using aspect-oriented techniques to dynamically build a repository that will maintain the relationship between generated system configuration elements and sections of template script files.

As previously mentioned, the system 700 would allow an administrator to manage the list of rules that constitute a relevant change at step 730.

FIG. 11 illustrates a flowchart showing steps that allows a manager or administrator to manage a list of rules that constitute a relevant change to a template modified in a stack, in accordance with an embodiment of the present invention. These rules are provided only by way of example and are not intended to limited the universe of rules provided to the administrator or manager. Similar to steps 720 and 730 of FIG. 10, the process illustrated by FIG. 11 begins with the step 810 of detecting changes, then proceeds to compare the changes with a set of rules. For example, at step 820 the system may determine whether the detected changes are outside a base operating system image. If not, then the system will capture the change and update the template at step 860. Next, at step 830 the system determines whether the detected change is outside of the base middleware and/or application file. If not, then again the system proceeds to step 860 where the change is captured and the template is updated. At step 840, the system determines whether the field of change already exists as a parameter in the template. If so, the system proceeds to step 860 where the change is captured and the template is updated. If not, the system proceeds to step 850 where it is determined whether the detected change is present in more than one stack. If so, the system again proceeds to step 860 where the change is captured and the template is updated.

Once changes are deemed worthy of inclusion, depending on the type of change (new configuration element versus modification of an existing configuration) the system either adds a new portion to define the new configuration element template or updates the relevant section of the template file.

Finally, to ensure the validity of the template modification, the system would provision a test stack and compare the resulting configuration to the repository to ensure that the template is still healthy.

Figure 12:
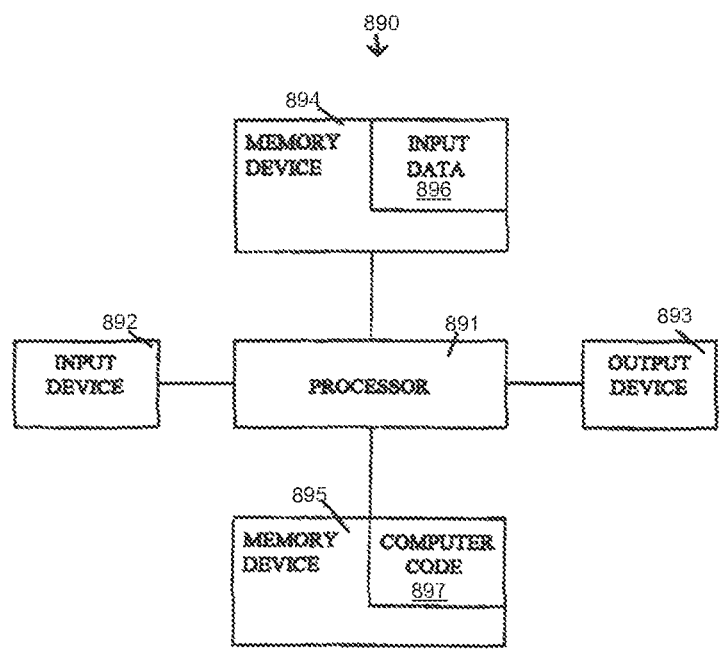
FIG. 12 illustrates a computer system used for implementing the methods of the present invention.

FIG. 12 illustrates a computer system used for implementing the methods of the present invention. The computer system 890 includes a processor 891, an input device 892 coupled to the processor 891, an output device 893 coupled to the processor 891, and memory devices 894 and 895 each coupled to the processor 891. The input device 892 may be, inter alia, a keyboard, a mouse, etc. The output device 893 may be, inter alia, a printer, a plotter, a computer screen, a magnetic tape, a removable hard disk, a floppy disk, etc. The memory devices 894 and 895 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 895 includes a computer code 897 which is a computer program that includes computer-executable instructions. The computer code 897 includes software or program instructions that may implement an algorithm for implementing methods of the present invention. The processor 891 executes the computer code 897. The memory device 894 includes input data 896. The input data 896 includes input required by the computer code 897. The output device 893 displays output from the computer code 897. Either or both memory devices 894 and 895 (or one or more additional memory devices not shown in FIG. 12) may be used as a computer usable storage medium (or program storage device) having a computer readable program embodied therein and/or having other data stored therein, wherein the computer readable program includes the computer code 897. Generally, a computer program product (or, alternatively, an article of manufacture) of the computer system 890 may include the computer usable storage medium (or said program storage device).

The processor 891 may represent one or more processors. The memory device 894 and/or the memory device 895 may represent one or more computer readable hardware storage devices and/or one or more memories.

Thus the present invention discloses a process for supporting, deploying and/or integrating computer infrastructure, integrating, hosting, maintaining, and deploying computer-readable code into the computer system 890, wherein the code in combination with the computer system 90 is capable of implementing the methods of the present invention.

While FIG. 12 shows the computer system 890 as a particular configuration of hardware and software, any configuration of hardware and software, as would be known to a person of ordinary skill in the art, may be utilized for the purposes stated supra in conjunction with the particular computer system 90. For example, the memory devices 894 and 895 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for monitoring and detecting changes for infrastructure orchestration templates, the method comprising:
   provisioning, by a computer, a stack using an existing template;
   detecting, by the computer, a change in the stack, wherein the detecting comprises comparing at least one configuration element of the stack to at least one definition stored within a repository of a system;
   determining, by the computer, whether the change is relevant to the existing template by matching the change to a corresponding component of the existing template related to the change;
   in response to the change being relevant, determining, by the computer, a type of change in the stack comprising a new configuration element or modification of an existing configuration;
   performing, by the computer, either updating a relevant section of the existing template or creating a new template by adding a new portion, which defines a new configuration element according to the type of change in the stack; and
   validating the modification by provisioning a test stack and comparing a resulting, configuration to the repository to ensure that the existing template is valid.

2. The method of claim 1, further comprising:
   comparing each configuration element of the stack to a definition stored within the repository of the system.

3. The method of claim 1, further comprising:
   detecting said change when a configuration element is not found within the repository.

4. The method of claim 1, further comprising:
   validating whether the change is present in a predetermined number of stack instances.

5. The method of claim 1, further comprising: performing both updating a relevant section of the existing template and creating a new template by adding a new portion to define the new configuration element according to the type of change.

6. The method of claim 1, further comprising:
   performing said step of detecting said change using discovery tools, a configuration management database, and/or a virtual machine introspection mechanism.

7. A computer program product comprising:
   a computer-readable storage device; and
   a computer-readable program code stored in the computer-readable storage device, the computer readable program code containing instructions executable by a processor of a computer system to implement a method for monitoring and detecting changes for infrastructure orchestration templates, the method comprising:
   provisioning a stack using an existing template;
   detecting a change in the stack, wherein the detecting comprises comparing at least one configuration element of the stack to at least one definition stored within a repository of a system;
   determining whether the change is relevant to the existing template by matching the change to a corresponding component of the existing template related to the change;
   in response to the change being relevant, determining a type of change in the stack comprising one of a new configuration and a modification of an existing configuration;
   performing either updating a relevant section of the existing template or creating a new template by adding a new portion to define the new configuration element according to the type of change in the stack; and
   validating the modification by provisioning a test stack and comparing a resulting configuration to the repository to ensure that the existing template is valid.

8. The computer program product of claim 7, further comprising:
   comparing each configuration element of the stack to a definition stored within the repository of the system.

9. The computer program product of claim 7, further comprising:
   detecting said change when a configuration element is not found within the repository.

10. The computer program product of claim 7, further comprising:
    validating whether the change is present in a predetermined number of stack instances.

11. The computer program product of claim 7, further comprising:
    performing both updating a relevant section of the existing template and creating a new template by adding a new portion to define the new configuration element according to the type of change.

12. A computer system for monitoring and detecting changes for infrastructure orchestration templates, the system comprising:

a central processing unit (CPU);

a memory coupled to said CPU; and a computer readable storage device coupled to the CPU, the storage device containing instructions executable by the CPU via the memory to implement a method of creating a virtual object, the method comprising the steps of:

provisioning a stack using an existing template;

detecting a change in the stack, wherein the detecting comprises comparing at least one configuration element of the stack to at least one definition stored within a repository of a system;

determining whether the change in the stack is relevant to the existing template by matching the change to a corresponding component of the existing template related to the change;

in response to the change being relevant, determining a type of change in the stack comprising one of a new configuration and a modification of an existing configuration;

performing either updating a relevant section of the existing template or creating a new template by adding a new portion to define the new configuration element according to the type of change; and validating the modification by provisioning a test stack and comparing a resulting configuration to the repository to ensure that the existing template is valid.

13. The computer system of claim 12, further comprising: comparing each configuration element of the stack to a definition stored within the repository of the system.

* * * * *